Sept. 28, 1965  A. B. HILDEBRANDT  3,209,364
FORCE AMPLIFIER

Filed July 27, 1961

ALEXANDER B. HILDEBRANDT *INVENTOR.*

BY John D. Gassett

*ATTORNEY*

Sept. 28, 1965     A. B. HILDEBRANDT     3,209,364
FORCE AMPLIFIER
Filed July 27, 1961                                                      2 Sheets-Sheet 2
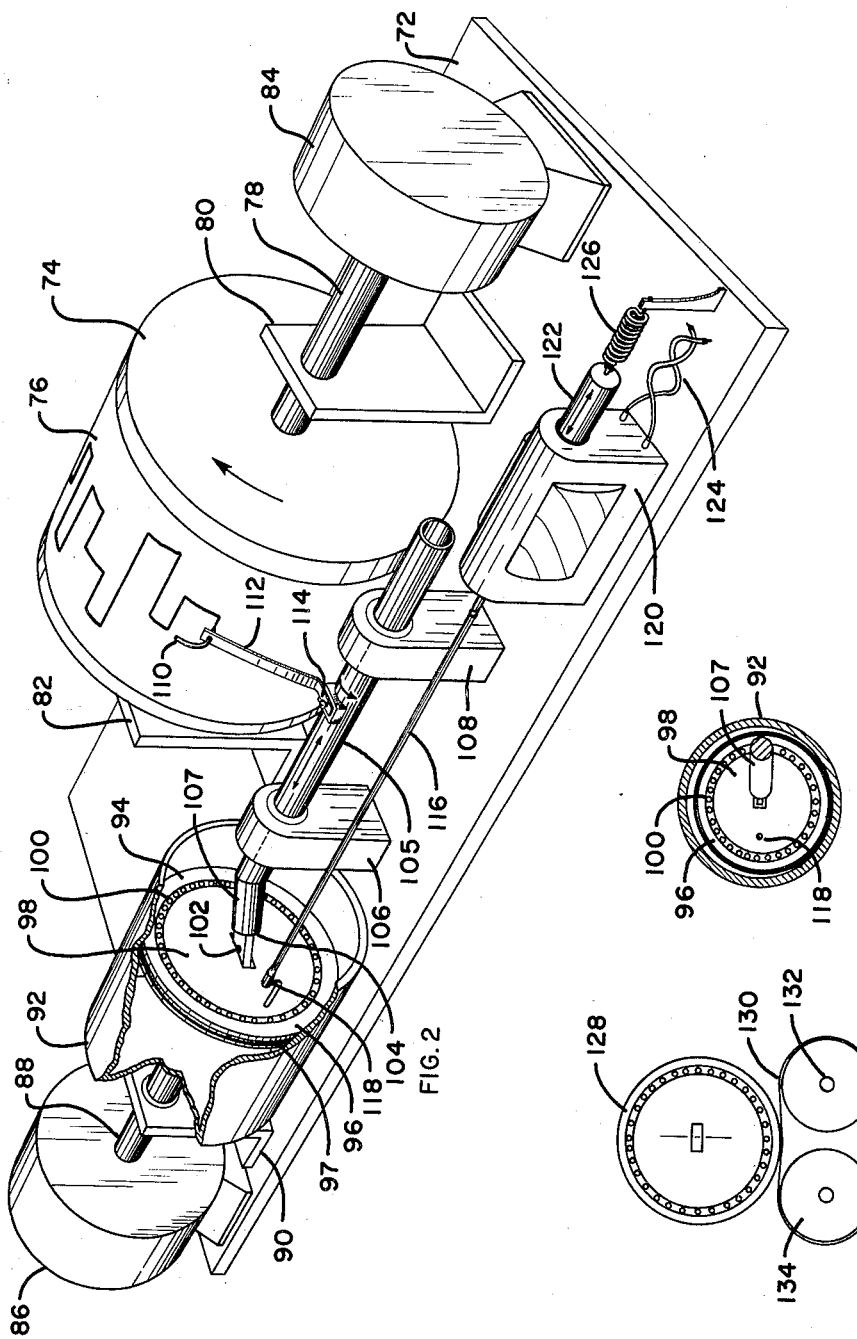
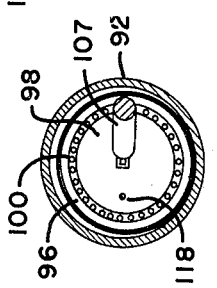
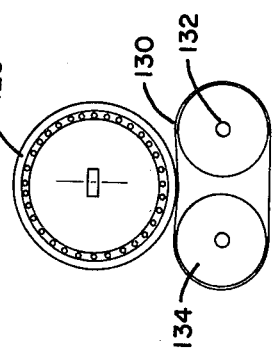
ALEXANDER B. HILDEBRANDT *INVENTOR.*
BY *John D. Gassett*
ATTORNEY

United States Patent Office 3,209,364
Patented Sept. 28, 1965

3,209,364
FORCE AMPLIFIER
Alexander B. Hildebrandt, Tulsa, Okla., assignor to Jersey Production Research Company, a corporation of Delaware
Filed July 27, 1961, Ser. No. 127,186
3 Claims. (Cl. 346—31)

This invention relates to measuring instruments which measure the variations or fluctuations of some parameter being measured. It concerns a mechanical type power amplifier. It relates especially to a mechanical amplifier for the amplification of small forces generated by a measuring element.

In a broad sense, this invention includes a mechanical force amplifier which is actuated by very small force motions generated in measuring some variable. Briefly, the invention broadly includes a moving surface which is power driven. A rotatable roller, having a guide means such as a yoke, is mounted in contact with the moving surface such that the moving surface imparts a rotary motion to the roller. Means are provided such that the roller can, in addition to having rotary motion, have lateral movement in a direction perpendicular, or normal, to the movement of the moving surface. A recording pen means is provided to follow the lateral movement of the roller. The guide means is connected to a measuring device, such as a Bourdon tube, which produces motions in response to variations in the measured parameter. As the guide means is turned by motion of the measuring device, the roller wheel moves laterally until it assumes a position such that the direction of the axis of rotation of the roller is essentially normally with the direction of movement of the moving surface at the point of contact. The guide means is guided by the very small force of the motion of the measuring device. In following this motion the roller develops a large force. Any lateral motion of the roller wheel is imparted to the recording pen. The pen can be used to make several carbon copies on a plurality of charts mounted on a moving drum, for example. The pen can be biased rather firmly against the moving chart and the lateral movement of the roller will nevertheless move the pen. The reaction thrust of the bias of the pen is preferably used to force the roller against the moving surface.

The objects and a better understanding of the invention can be had from the following description taken in conjunction with the drawing in which:

FIG. 2 illustrates another embodiment of the invention;

FIG. 3 is a segmentary view of the apparatus of FIG. 2 illustrating the roller means and power cylinder; and, FIG. 4 illustrates another embodiment of the roller and the powered moving surface.

Figure 1:
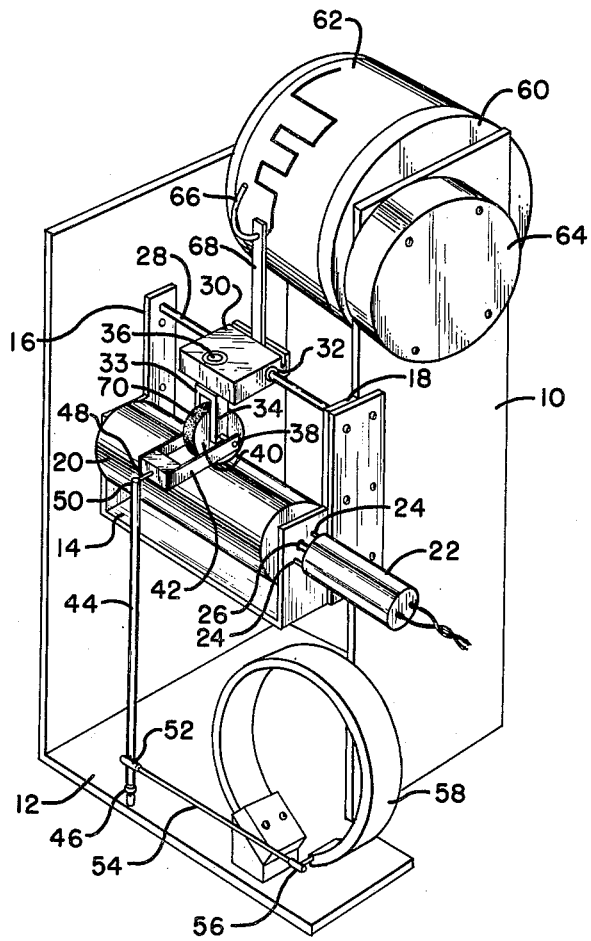
FIG. 1 illustrates a first embodiment of an apparatus of the invention.

Turning now to the drawing and FIG. 1 in particular, there is illustrated an embodiment of this invention which has been constructed and operated. Illustrated thereon is a frame 10 having a base 12 and a shelf 14 which has a left upright support 16 and a right upright support 18. Rotatably mounted between supports 16 and 18, on an axis not illustrated, is power or drive cylinder 20. Drive motor 22, which is conveniently an electrical motor but can be other forms of power, is supported from upright support member 18 by support members such as bolts 24. Motor 22 drives cylinder 20 through common shaft 26.

Also mounted between upright support member 16 and 18 is rod 28 which is essentially parallel to the axis of drive cylinder 20. Upon rod 28 is mounted follower carriage 30. This follower carriage is mounted, through means such as ball bushing 32, to have longitudinal and rotatable movement with respect to rod 28. A yoke 34 extends downwardly essentially perpendicularly from follower carriage 30. The shaft 36 of yoke 34 is rotatably mounted in follower carriage 30, that is, yoke 34 is free to rotate about the axis of shaft 36.

A shaft 38 extends through the lower end or finger elements 33 of yoke 34. Shaft 38 is preferably in a plane substantially parallel to the axis of drive cylinder 20. Mounted on shaft 38 is roller 40 which is free to rotate about shaft 38. Also mounted on the ends of shaft 38 is guide bracket 42. When the device is assembled, it is preferred that the axis of shaft 36 is substantially in the same plane and perpendicular to the axis of rotation of cylinder 20, however, the exact alignment is not critical.

A first guide linkage 44 is pivotally connected to the base 12 in a manner to have pivotal movement such as through connection 46 which can conveniently be a ball and socket joint. The upper end of upright linkage 44 is pivotally connected to guide pin 48 of guide bracket 42 through a ball and socket type connection 50 to permit pivotal movement similarly as connection 46. Near the lower end of upright linkage 44 is another pivotal connection means such as ball and socket assembly 52 to which a second linkage 54 is pivotally connected to upright linkage 44. Second linkage member 54 is pivotally connected such as by a ball and socket joint 56 to Bourdon tube 58 or other motion producing measuring means. Bourdon tube 58 is shown mounted on base 12 and the pressure connection of the Bourdon tube is not illustrated as it is well known.

Mounted to the upper part of frame 10 is recording drum 60 about which is placed a recording chart 62. Drum 60 can be rotated as illustrated by a clock motor 64. Pen 66 is provided for marking on chart 62. A pen spring arm 68 holds pen 66 at one end and the other end of spring arm 68 is attached to follower carriage 30. Spring arm 68 forces pen 66 against chart 62. The reaction thrust of this force forces roller 40 firmly against drive cylinder 20. The cylindrical surface of cylinder 20 and the material of surface 70 of roller 40 should be such that they have a high coefficient of friction so as to have more power in driving carriage 30 when roller 40 is turned by bracket 42. The coefficient of friction is preferably about .5 or higher. If cylinder 20 is made of steel, an especially preferred material for surface 70 is hard rubber as this has been found to work especially well. However, it will be understood that other materials having high coefficients with respect to each other can be used.

Having described the component parts of the apparatus of FIG. 1 attention will now be directed briefly toward its operation. In operation Bourdon tube 58 is connected to the fluid for which it is desired to measure the pressure. Prior to the starting of clock motor 64 a chart is placed on drum 60. As pen 66 is pressed with considerable force against the chart; many charts, with carbon between them, can be placed on drum 60. Clock motor 64 is started and drive motor 22 is also energized. When motor 22 is started, cylinder 20 is likewise rotated. As roller 40 is forced against the surface of cylinder 20, roller 40 is likewise rotated. The speed of rotation of drive cylinder 20 can vary considerably, however, in general it can be said that the faster the cylinder turns, the greater the speed of response of the roller in positioning carriage 30.

When the pressure in Bourdon tube 58 varies, it likewise imparts motion to linkage 54. As linkage 54 is connected to upright linkage 44, this motion is imparted through upright linkage 44 to guide bracket 42. The guide motion from the Bourdon tube is thus applied to control guide bracket 42. The change in the position of the guide bracket changes the plane of rotation of roller 40 with respect to the axis of cylinder 20. That is, the plane of rotation is at an angle α with a plane through the center of roller 40 perpendicular to the axis of cylinder 20. This causes roller 40 which is rotated by the rotating cylinder 20, to move laterally across the surface of drive cylinder 20 similar to the action of a lead screw. The rate of lateral movement is greatest when the angle α is a maximum and decreases to zero when α reaches zero. This lateral motion of roller 40 is imparted to follower carriage 30. Roller 40 carries follower carriage 30 and pen 66 with it and faithfully and rapidly follows the movement of Bourdon tube 58. The speed with which the movement of Bourdon tube 58 is followed is primarily dependent upon the surface speed of cylinder 20, assuming no slippage. In general it can be said that the faster cylinder 20 rotates, the more rapidly roller 40 moves laterally to follow the movement of Bourdon tube 58. As carriage 30 is moved laterally on rod 28, pen 66 is likewise moved laterally across the chart 62 such that the movement of Bourdon tube 58 is recorded on the chart. The control force required from an external force, such as Bourdon tube 58, to position accurately guide bracket 42 is as little as 0.2 gram. The change in control force required is dependent to an extent upon R, which is the length of bracket 42 from its axis to pivot 50, the coefficient of friction between surface 70 of roller 40 and the surface of cylinder 20, the bias of roller 40 against cylinder 20 and the coefficient of friction of surface 70 and surface of cylinder 20. A preferred relationship of $D_1$ to $D_2$ in which $D_1$ is the diameter of roller 40 and $D_2$ is the diameter of cylinder 20 is about 1.

A force amplifier or rectilinear recorder similar to the embodiment of FIG. 1 has been constructed and operated with success. In that device $D_1$, the diameter of roller 40, was about 1.5 inches and $D_2$, the diameter of drive cylinder 20, was about 2 inches. R, the length of guide bracket 42 and pin 48, was about 1.5 inches. The scale of the chart was 4 inches wide representing a range of 100 p.s.i. variations of Bourdon tube 58. Cylinder 20 was made of steel and surface 70 of roller 40 was a rubber ring about 1.6 inches in diameter when undeformed. The rubber was 80 durometers. When the drive cylinder 20 was rotated at about 200 r.p.m., pen 66 followed within about .003 inch. A force of less than about 0.5 gram is sufficient to guide the roller to follow the motion of the measuring device.

One advantage of the system of this invention is that there is no over-shooting. That is, pen 66 will faithfully follow the movement of Bourdon tube 58. If the movement is more or less a square wave, as shown on curve 62, there will be no over-shooting by pen 66 at the corners such as commonly occurs with galvanometers. The instrument can also be operated in any position.

Attention will now be directed to FIG. 2 which shows another embodiment of the invention. In FIG. 1 the external surface 70 of roller 40 contacts the external force of the driving cylinder 20. In FIG. 2 this is modified such that the outside of the guide roller strikes the inside surface of the driving cylinder. In other words, in FIG. 1 there is concave to concave contact. In FIG. 2 there is concave to convex surface contact which is designed to increase the area of contact between the driving and driven surfaces.

In FIG. 2 there is illustrated a base 72 upon which is mounted a rotating drum 74 which carries chart 76. Drum 74 is mounted upon shaft 78 which is mounted to upright members 80 and 82 which are supported from base 72. A clock motor 84 supported from base 72 is provided to rotate drum 74 through shaft 78.

Also mounted on base 72 is a motor power source 86 which drives shaft 88. Shaft 88 is supported from the base 72 by upright support 90. Shaft 88 is connected to a hollow cylindrical drive member or cylinder 92 such that motor 86 can drive cylinder 92. Mounted inside cylinder 92 is driven or idler roller member 94. The outer portion or roller 96 is rotatably mounted about an inner nonrotating portion or roller carriage guide member 98 by bearing means 100. Inner nonrotating member 98 is pivotally attached about pivot 102 to a "bent" or angle shaft member 104. Shaft 104 has a first straight section 105 and a second straight section 107 which has pivot 102. Straight part 105 is rotatably supported from base 72 to upright support members 106 and 108. Section 105 of shaft 104 has both lateral and rotational movement with respect to support member 106 and 108. The rotational movement, as will be seen, is limited by spring arm 112. The angle which section 105 makes with section 107 need not be great; the angle should be such that rotation of section 105 forces roller 96 firmly against the inner wall of cylinder 92. Also section 107 need not be straight.

A recording pen 110 is carried by spring 112 which is secured to shaft section 105 by a bolt or other means at 114. Spring 112 throws a bias on shaft 104 in the direction of the arrow. The reaction of this is used to urge roller 96 against the interior of cylinder 92. A guide linkage 116 is connected at one end to the nonrotating guide member 98 through a ball and socket joint 118. Ball and socket joint 118 is fixed to guide member 98 at a point near the periphery thereof. The other end of guide rod linkage 116 is connected to a motion producing device such as solenoid 120 in which core 122 varies longitudinally therein in accordance with the current passing inwardly through leads 124. Core 122 is biased by spring member 126 in a known manner. It is believed that the operation of the device in FIG. 2 is fairly obvious in view of the description given above in regard to FIG. 1. Briefly it can be said that when the measuring device moves, it imparts a movement to linkage 116. The movement of linkage 116 imparts a movement of roller carriage 98 about pivot 102. When cylinder 92 is rotating, this movement causes roller carriage 98 and roller 96 to move laterally from the interior of cylinder 92 thus driving shaft 104 laterally through support members 106 and 108. The force of this lateral movement is dependent upon the coefficient of friction between surface 97 of roller 96, which can preferably be rubber, against the interior of cylinder 92 which can be steel, to rotate. The roller moves laterally much like a lead screw until the plane of rotation of the roller is substantially perpendicular to the axis of rotation of cylinder 92.

In FIG. 1 the roller and the driving member were each concave, that is a concave surface was rotating against another concave surface. In FIG. 2 the concave surface rotated against a convex surface. If desired, a concave surface of the roller can operate against a flat moving surface. Such an arrangement is briefly illustrated in FIG. 4. Shown thereon is a roller 128 which is mounted on an endless belt 130 driven by driving rollers 132 and 134.

While there are above disclosed but a limited number of embodiments of the system of the present invention, it is possible to produce still other embodiments without departing from the inventive concept herein disclosed. It is therefore desired that only such limitations be imposed on the appended claims as are stated therein, or required by the prior art.

What is claimed is:

1. A mechanical force amplifier for use with a measuring device which produces motion in response to variations in the measured medium which comprises in combination: a frame means; a driving cylinder rotatably supported from said frame means; means to drive said cylinder; a rod supported by said frame means parallel to the axis of said cylinder; a follower carriage rotatably and slidably mounted upon said rod; a yoke member having a shaft and two spaced-apart finger elements, said shaft mounted in said follower carriage such that the shaft of said yoke is pivotally mounted in and supported from said carriage; a roller rotatably mounted between said finger elements of said yoke; means for carrying a chart supported by said frame; a spring arm carried by said follower carriage; a pen supported by said spring arm, said spring arm, said chart support means, said carriage, said yoke, said roller, and said power cylinder are supported so that the reaction thrust of said spring arm and said chart means is transmitted through said carriage, said yoke, and said roller to said drive cylinder; and means to change the plane of rotation of said roller in response to movement of said measuring device.

2. A mechanical force amplifier for use with a measuring device which produces motion in response to variations in measuring a medium which comprises in combination: a frame means; a movable surface; power means for moving said surface; a rod supported by said frame means parallel to the movable surface and normal to the direction of movement of said surface; a follower carriage rotatably and slidably mounted upon said rod; a yoke member having a shaft element and two spaced-apart finger elements, said shaft element rotatably mounted in and supported by said follower carriage; a roller rotatably mounted between said finger elements of said yoke; chart support means for carrying a chart supported by said frame; a spring arm carried by said follower carriage; a pen supported by said spring arm; said spring arm, said chart support means, said carriage, said yoke, said roller, and said movable surface are supported so that the reaction thrust of said spring arm and said chart support means is transmitted through said carriage, said yoke and said roller to said movable surface; and means to change the plane of rotation of said roller in response to movement of said measuring device.

3. A mechanical power amplifier for use with a measuring device which produces motion in response to variations in measuring a medium which comprises:
   a frame means;
   a movable surface;
   power means for moving said surface in a uni-direction;
   a guide rod supported by said frame means and parallel to and above said movable surface and in a direction substantially normal to the direction of movement of said movable surface;
   a carriage rotatably and slidably mounted upon said guide rod;
   a roller means supported by said carriage and in frictional contact with said movable surface;
   chart support means for carrying a chart supported by said frame;
   a spring arm carried by said carriage;
   a pen supported by said spring arm; said spring arm, said chart support means, said carriage, said roller, and said movable surface are supported so that the reaction thrust of said spring arm and said chart means is transmitted through said carriage, and said roller to said movable surface; and
   steering means for varying the plane of rotation of said roller in response to the motion of said measuring device.

References Cited by the Examiner
UNITED STATES PATENTS

| | | | |
|---|---|---|---|
| 348,414 | 8/86 | Rae | 346—6 |
| 2,412,386 | 12/46 | Barell | 74—388 |
| 2,846,641 | 8/58 | Basham | 346—32 X |
| 2,940,322 | 6/60 | Uhing | 74—22 |

LEO SMILOW, *Primary Examiner.*

EMIL G. ANDERSON, *Examiner.*